United States Patent [19]
Quinones

[11] Patent Number: 5,928,770
[45] Date of Patent: Jul. 27, 1999

[54] TEAR/PUNCTURE RESISTANT MATERIAL

[76] Inventor: Victor Manuel Quinones, 7123 Horizon Peak, San Antonio, Tex. 78233

[21] Appl. No.: 09/004,326

[22] Filed: Jan. 8, 1998

[51] Int. Cl.⁶ ..................................................... D03D 3/00
[52] U.S. Cl. ....................... 428/212; 428/34.7; 428/36.9; 428/105; 428/109; 428/141; 428/216; 428/297.1; 428/315.9; 428/423.7; 428/424.2; 428/480; 428/908.8; 428/911; 442/181; 442/236; 442/394; 264/151; 156/78; 156/244.25; 156/256
[58] Field of Search ..................................... 428/196, 198, 428/141, 138, 34.7, 36.7, 36.1, 36.9, 297, 516, 224, 246; 252/389.54, 194; 156/78, 244.25, 191, 244.11; 264/151, 149; 442/181

[56] References Cited

U.S. PATENT DOCUMENTS

| | | | |
|---|---|---|---|
| 2,742,388 | 4/1956 | Russell | 154/110 |
| 3,130,647 | 4/1964 | Anderson et al. | 156/62.8 |
| 3,715,251 | 2/1973 | Prentice | 156/62.8 |
| 4,264,659 | 4/1981 | Pattenden | 428/35 |
| 4,668,566 | 5/1987 | Braun | 428/198 |
| 4,748,070 | 5/1988 | Beehler | 428/198 |
| 4,749,423 | 6/1988 | Vaalburg et al. | 156/181 |
| 5,187,005 | 2/1993 | Stahle et al. | 428/252 |
| 5,209,869 | 5/1993 | Miksic et al. | 252/389.54 |
| 5,272,023 | 12/1993 | Yamamoto | 428/198 |
| 5,342,469 | 8/1994 | Bodford et al. | 156/244.22 |
| 5,424,115 | 6/1995 | Stokes | 428/198 |

FOREIGN PATENT DOCUMENTS

| | | |
|---|---|---|
| 639751 | 4/1962 | Canada . |
| 1307386 | 12/1962 | France . |
| 1490626 | 9/1972 | Germany . |
| 52-43594 | 5/1977 | Japan . |
| 60-68934 | 4/1985 | Japan . |

*Primary Examiner*—Deborah Jones
*Assistant Examiner*—Abraham Bahta
*Attorney, Agent, or Firm*—Richard C. Litman

[57] ABSTRACT

A tear/puncture resistant material made of polyethylene and polypropylene. The material is ideally suited for wrapping steel or many other uses. The material of the present invention includes four layers attached by lamination. The outer layer is woven polyethylene, which imparts tear resistance to the material. This outer layer is laminated to a layer of extruded polyethylene. This layer, which provides breaking and puncture resistance to the material, is laminated to a layer of polypropylene, which provides additional elasticity. The layer of polypropylene is laminated to an inner layer of polyethylene impregnated with a volatile corrosion inhibitor (VCI) such as sodium nitrite. This inner layer, which increases the puncture resistance of the material, provides corrosion protection to the wrapped object, e.g. a steel roll.

9 Claims, No Drawings

TEAR/PUNCTURE RESISTANT MATERIAL

BACKGROUND OF THE INVENTION

1. Field of the Invention

The present invention relates to material, which may be used to wrap rolls of steel, that is both tear and puncture resistant.

2. Description of the Related Art

Previous compositions have been made with combined layers of materials so that the final product exhibits the properties of both layers. No materials exist, however, possessing the unique properties of the instant invention, particularly providing a material which is most suitable for wrapping rolls of steel.

U.S. Pat. No. 2,742,388, issued on Apr. 17, 1956 to A. W. Russell, teaches two or more thicknesses of plastic material bonded together at their lateral edges to increase the modulus of deflection beyond the increase that occurs from the additional thickness of plastic material.

U.S. Pat. No. 3,130,647, issued on Apr. 28, 1964 to W. E. Anderson, teaches a method of making a material having a layer of polyethylene and a layer of kraft paper.

U.S. Pat. No. 3,715,251, issued on Feb. 6, 1973 to J. S. Prentice, teaches the lamination of mats of thermoplastic fibers having different properties to impart the benefit of the different properties to the final material.

U.S. Pat. No. 4,668,566, issued on May 26, 1987 to Ralph V. Braun teaches a fabric made from a layer of polypropylene and a layer of polyethylene to increase softness and tensile strength.

U.S. Pat. No. 4,478,070, issued on May 31, 1988 to David C. Beehler, teaches that the tear resistance of biaxially-oriented polypropylene film is increased when it is laminated to a fibrous web of polypropylene.

U.S. Pat. Nos. 4,749,423, issued on Jun. 7, 1988 to Lawrence Vaalburg, and 5,272,023, issued on Dec. 21, 1993 to Kazue Yamamoto et al., teach a method of making a bonded non-woven web and a method of making a polypropylene sheet, respectively.

U.S. Pat. No. 5,342,469, issued on Aug. 30, 1994 to Carl A. Bodford et al., teaches a method of bonding polypropylene and polyethylene webs, and U.S. Pat. No. 5,424,115, issued on Jun. 13, 1995 to Ty J. Stokes teaches point bonded non-woven fabrics.

Canadian Patent No. 639,751, issued on Apr. 10, 1962, teaches heat-shrinkable polyethylene or polypropylene. French Patent No. 1,307,386, published in December, 1962, German Patent No. 1,490,626, issued on Sep. 21, 1972, and Japanese Patent Nos. 52-43594, published on Apr. 5, 1977, and 60-68934, published on Apr. 19, 1985, teach multi-layer compositions.

None of the above inventions and patents, taken either singularly or in combination, is seen to describe the instant invention as claimed. These inventions lack the tear and puncture resistance provided by the instant invention. Thus, the tear/puncture resistant material as described below is desired.

SUMMARY OF THE INVENTION

The material of the present invention, which is made of polyethylene and polypropylene, exhibits excellent tear and puncture resistance. The material is ideally suited for wrapping steel, or many other uses. The material of the present invention includes four layers attached by lamination. The outer layer is woven polyethylene, which imparts tear resistance to the material. This outer layer is laminated to a layer of extruded polyethylene. This layer, which provides breaking and puncture resistance to the material, is laminated to a layer of polypropylene, which provides additional elasticity. The layer of polypropylene is laminated to an inner layer of polyethylene impregnated with a volatile corrosion inhibitor (VCI) such as sodium nitrite. This layer, which increases the puncture resistance of the material, provides corrosion protection to the wrapped object, e.g. a steel roll.

Accordingly, it is a principal object of the invention to provide a wrapping material which has the properties of tear resistance and puncture resistance.

It is another object of the invention to provide corrosion resistance to the object wrapped by the material.

Still another object of the invention is to provide a wrapping material that is impervious to water or other moisture.

These and other objects of the present invention will become readily apparent upon further review of the following specification.

DETAILED DESCRIPTION OF THE PREFERRED EMBODIMENT

The present invention is a material that is both tear and puncture resistant, properties that make it invaluable for wrapping rolls of steel or similar types of objects. The material is made of a layer of woven polyethylene, a layer of extruded polyethylene, a layer of polypropylene, and a layer of polyethylene impregnated with a corrosion inhibitor. These layers are preferably laminated together. However, any known method of joining these layers together is contemplated by the present invention.

The layer of woven polyethylene preferably has a thickness of approximately 4 mils. This layer provides multi-directional strength, i.e. tear resistance in both the machine and the cross direction. Threads running in the machine and cross directions, preferably in the ratio of 9:4, provide this multi-directional strength. Because the woven polyethylene does not stretch, the problem of pinching, i.e. the material expanding and contracting as the steel roll is moved, is eliminated.

Despite the significant benefits of the woven polyethylene, it is subject to breakage, i.e. when great tensile forces are applied to it, it breaks rather than stretches. However, one of the benefits of the material of the present invention is that the beneficial properties of each layer are enjoyed by the overall product. Equally beneficial is that the shortcomings of each layer are overcome by the other layers, which have different properties.

The layer of non-woven, extruded polyethylene, has a thickness of approximately 1 mil, and provides breaking and puncture resistance to the material. Extra elasticity and, therefore, breaking and puncture resistance are provided to the material by a layer of polypropylene.

The layer of polypropylene, which is softer and more elastic than polyethylene, is used with the non-woven polyethylene to increase the tensile strength of the material. The layer of polypropylene has a thickness of approximately 4–16 mils and a basis weight of approximately 0.5–2 oz/yd, preferably approximately 7.5–8 mils and 1 oz/yd, respectively.

An additional layer of polyethylene, impregnated with volatile corrosion inhibitor (VCI), provides corrosion resistance, a highly significant property in the art of wrapping steel, to the material. This layer of polyethylene has a thickness of approximately 0.8–2 mils, preferably approximately 1 mil. The volatile corrosion inhibitor used in this layer, which contacts the steel, is preferably sodium nitrite.

It is to be understood that the present invention is not limited to the embodiment described above, but encompasses any and all embodiments within the scope of the following claims.

I claim:

1. A tear/puncture resistant laminated material for wrapping steel, said laminated material consisting essentially of:

an outer layer of woven polyethylene laminated to a layer of extruded polyethylene laminated to a layer of polypropylene laminated to an inner layer of polyethylene impregnated with a corrosion inhibitor.

2. The tear/puncture resistant material as defined in claim 1 wherein said layer of woven polyethylene has a thickness of approximately 4 mils.

3. The tear/puncture resistant material as defined in claim 1 wherein said layer of extruded polyethylene has a thickness of approximately 1 mil.

4. The tear/puncture resistant material as defined in claim 1 wherein said layer of polypropylene has a thickness of approximately 4–16mils.

5. The tear/puncture resistant material as defined in claim 4 wherein said layer of polypropylene has a thickness of approximately 7.5–8 mils.

6. The tear/puncture resistant material as defined in claim 1 wherein said layer of polyethylene impregnated with a corrosion inhibitor has a thickness of approximately 0.8–2 mils.

7. The tear/puncture resistant material as defined in claim 6 wherein said layer of polyethylene impregnated with a corrosion inhibitor has a thickness of approximately 1 mil.

8. The tear/puncture resistant material as defined in claim 1 wherein said corrosion inhibitor is sodium nitrite.

9. A tear/puncture resistant laminated material for wrapping steel, said laminated material consisting essentially of:

an outer layer of woven polyethylene having a thickness of approximately 4 mils laminated to a layer of extruded polyethylene having a thickness of approximately 1 mil laminated to a layer of polypropylene having a thickness of approximately 7.5–8 mils laminated to an inner layer of polyethylene impregnated with sodium nitrite and having a thickness of approximately 1 mil.

* * * * *